Nov. 29, 1938.  J. C. KARNES  2,138,035
POSITION FINDING INSTRUMENT
Filed Jan. 28, 1938
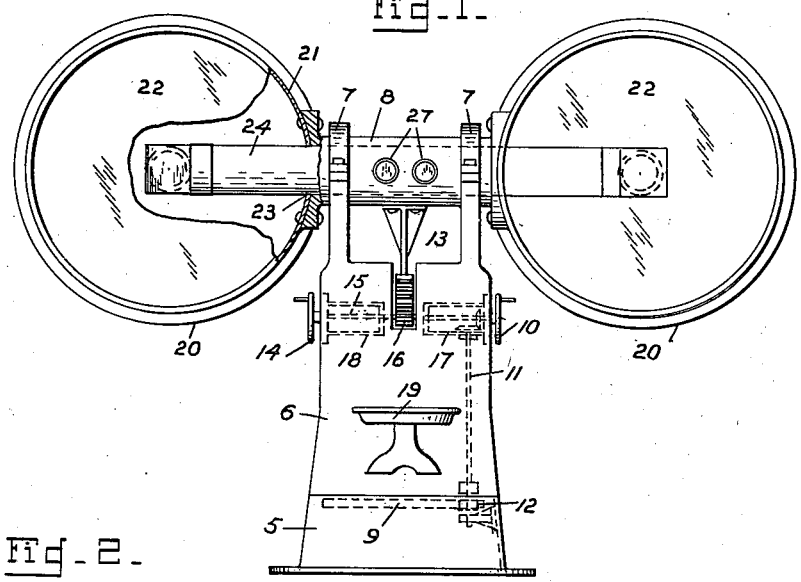
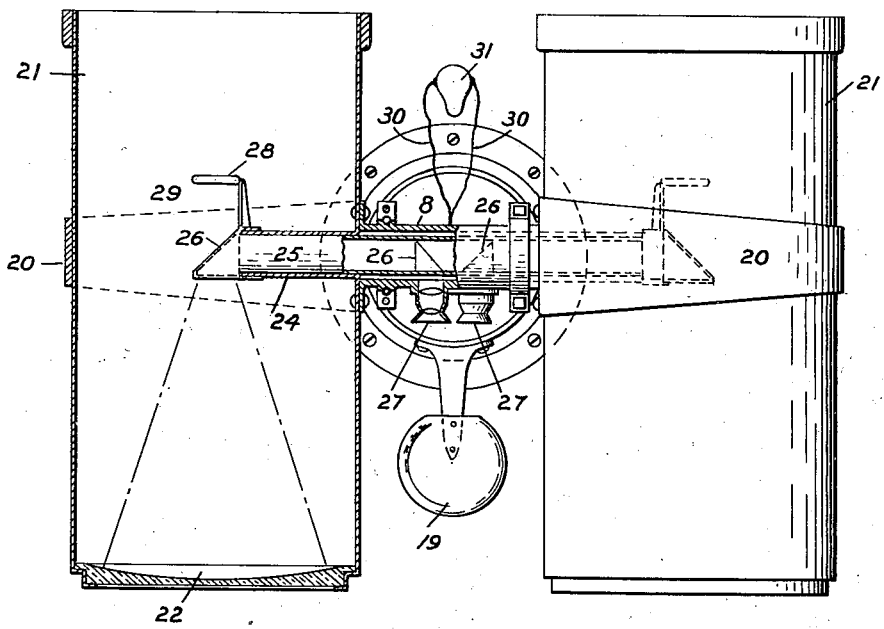
Inventor
James C. Karnes
By W. N. Roach.
Attorney

UNITED STATES PATENT OFFICE 2,138,035

POSITION FINDING INSTRUMENT

James C. Karnes, Buffalo, N. Y.

Application January 28, 1938, Serial No. 187,437

4 Claims. (Cl. 88—2.6)

(Granted under the act of March 3, 1883, as amended April 30, 1928; 370 O. G. 757)

The invention described herein may be manufactured and used by or for the Government for governmental purposes, without the payment to me of any royalty thereon.

The subject of this invention is a position finding instrument.

In antiaircraft gunnery it is the practice at the present time to determine the position of an airplane at night by employing a sound locating apparatus to obtain data, which when corrected for sound lag, is used to point a searchlight. When the target is illuminated a data computer or director is brought into play and must track the target for some distance before its data is sufficiently accurate to warrant the opening of fire by the guns. As soon as the searchlights go into action the pilot of the aircraft is apprised of the fact that he is under observation and he may attack the position disclosed by the searchlights or maneuver to escape from the beam to avoid the area covered by the guns that are associated with the searchlights, or to prevent the director from obtaining continuous and accurate data.

The purpose of this invention is to provide a position finding instrument which dispenses with the searchlights and which will enable the daylight system of firing to be employed at night. The instrument is characterized by a simple and compact arrangement in which a pair of relatively large casings serve both as sound receivers for a sound locating apparatus and as light receivers for a night glass which may include a stereoscopic range finder.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a view in rear elevation, with parts broken away of an instrument constructed in accordance with the invention;

Fig. 2 is a plan view, partly in section.

Referring to the drawing by characters of reference there is shown a support 5 for rotatably mounting a top carriage 6 which includes a pair of spaced bearings 7—7 for rotatably mounting a horizontally disposed hollow trunnion 8. A traversing mechanism comprises a ring gear 9 on the support and a handwheel 10, shafting 11 and pinion 12 carried by the carriage 6. An elevating mechanism comprises a rack 13 on the trunnion and a handwheel 14, shafting 15 and pinion 16 carried by the carriage. Transmitter motors 17 and 18 of self-synchronous transmission systems are associated respectively with the traversing and elevating mechanisms. A seat 19 for an operator is fastened to the carriage in convenient relation to the handwheels.

The hollow trunnion is provided with a pair of bands 20—20 which are disposed on the outer side of the bearings. Each band carries a casing 21 which serves both as a light and a sound receiver. One end of the casing is open while the other end is closed and carries a curved reflector 22 which is preferably parabolic. The wall of each casing adjacent the trunnion is formed with an aperture 23 and carries a radially disposed and inwardly extending tube 24 whose inner end terminates near the optical axis of the reflector.

A stereoscopic range finder 25 passing through the hollow trunnion 8 and movable therewith extends through the tubes 24—24 in the casing 21 and its reflecting prisms 26—26 are each on the axis of a reflector. The eye pieces 27—27 of the range finder extend through the openings in the hollow trunnion. The range finder is of conventional design and has provision for directly reading range.

A microphone 28 is placed in each casing preferably at or near the focal point of the reflector 22 and is conveniently supported by means of a bracket 29 attached to the tube 24. The microphones in the two casings are connected by wiring 30—30 to a headset 31 which is to be worn by the operator.

In employing the instrument under conditions of darkness to find the position of an object in space, such as an airplane, the operator ascertains the approximate position and direction of travel by listening through the headset and using its binaural sense. Then, allowing for the sound lag and direction of travel he sweeps the instrument until the airplane is brought into view. The movements generated by the traversing and elevating mechanism in tracking the airplane provide information as to its position and rate of travel and this information may be readily made available to the data computing station for ordnance.

I claim.

1. A position finding instrument including a support, a carriage rotatably mounted on the support, a hollow trunnion rotatably mounted on the carriage, a pair of casings carried by the trunnion and having an open end and a closed end, a reflector in the closed end of each casing, a stereoscopic range finder passing through the hollow trunnion and movable therewith, said range finder extending into the casings and including prisms positioned on the axis of the reflectors, a microphone in each casing positioned on the axis of the reflector, wiring leading from the microphones, a headset on the wiring, means for traversing the carriage and means for elevating the trunnion.

2. A position finding instrument including a support, a carriage rotatably mounted on the support, a hollow trunnion rotatably mounted on the carriage, a pair of casings carried by the trunnion and having an open end and a closed end, a reflector in the closed end of each casing, a binocular optical instrument passing through the hollow trunnion and movable therewith, said optical instrument extending into the casing and including prisms positioned on the axis of the reflectors, a microphone in each casing positioned on the axis of the reflector, wiring leading from the microphones, a headset on the wiring, means for traversing the carriage and means for elevating the trunnion.

3. A position finding instrument including a support, a carriage rotatably mounted on the support, a hollow trunnion rotatably mounted on the carriage, a pair of casings carried by the trunnion and having an open end and a closed end, a reflector in the closed end of each casing, a stereoscopic range finder passing through the hollow trunnion and movable therewith, said range finder extending into the casings and including prisms positioned on the axis of the reflectors, means for traversing the carriage, and means for elevating the trunnions.

4. A position finding instrument including a support, a carriage rotatably mounted on the support, a hollow trunnion rotatably mounted on the carriage, a pair of casings carried by the trunnion and having an open end and a closed end, a reflector in the closed end of the casing, a binocular optical instrument passing through the hollow trunnion and movable therewith, said optical instrument extending into the casings and including prisms positioned on the axis of the reflectors, means for traversing the carriage, and means for elevating the trunnions.

JAMES C. KARNES.